July 30, 1957 — E. E. SCHWARZENBACH ET AL — 2,801,373
AUTOMATIC CYCLING CONTROL
Filed Sept. 8, 1953 — 3 Sheets-Sheet 1

INVENTORS.
Earl E. Schwarzenbach,
& James T. Williams
By Robert L. Kahn
Atty.

July 30, 1957  E. E. SCHWARZENBACH ET AL  2,801,373
AUTOMATIC CYCLING CONTROL
Filed Sept. 8, 1953  3 Sheets-Sheet 3
Fig. 3
| MINUTES | 2 | 4 | 6 | 8 | 10 | 12 | 14 | 16 | 18 | 20 | 22 | 24 | 26 | 28 | 30 | 32 | 34 | OFF |
|---|---|---|---|---|---|---|---|---|---|---|---|---|---|---|---|---|---|---|
| STEPS OR POSITIONS | 1 | 2 | 3 | 4 | 5 | 6 | 7 | 8 | 9 | 10 | 11 | 12 | 13 | 14 | 15 | 16 | 17 | 18 |
| POWER FROM TO | | | | | | | | | | | | | | | | | | |
| LINE — MOTORS | ▓ | | ▓ | ▓ | ▓ | ▓ | ▓ | ▓ | ▓ | ▓ | ▓ | ▓ | | ▓ | ▓ | ▓ | ▓ | |
| WASHER MOTOR — 2WAY VALVE | | | | | | | | | | | ▓ | | | | | | | |
| AGITATOR | ▓ | ▓ | ▓ | ▓ | ▓ | ▓ | ▓ | ▓ | ▓ | ▓ | | | | | | | | |
| 2WAY VALVE | ▓ | | | | | | | | | | | | | | | | | |
| SUDS SOLENOID | ▓ | | | | | | | | | | | | | | | | | |
| FLOAT SW. — EXTRACTOR | | | | | | | | | | | | ▓ | ▓ | ▓ | ▓ | ▓ | ▓ | |
| MIXED WATER | | | | | | | | | | | | | | ▓ | | | | |
| SPRAY CAM | | | | | | | | | | | ▓ | ▓ | ▓ | | ▓ | ▓ | | |
| MIXED WATER | | ▓ | | | | | | | | | | | | | | | | |
| HOT WATER | ▓ | | | | | | | | | | | | | | | | | |
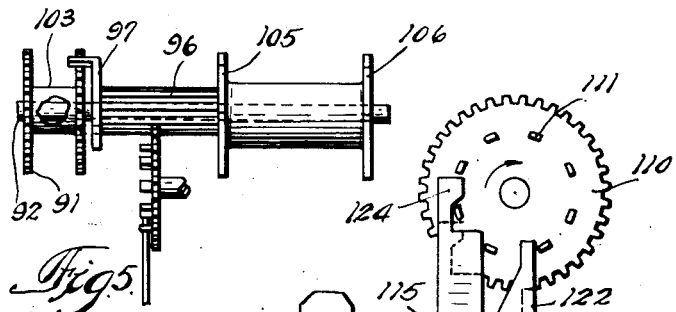
Fig. 5
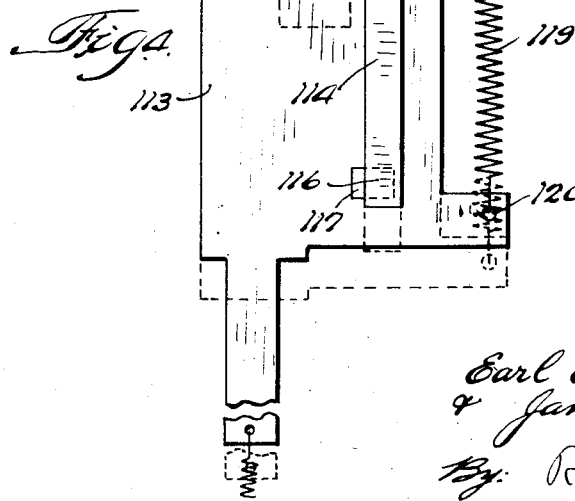
Fig. 4
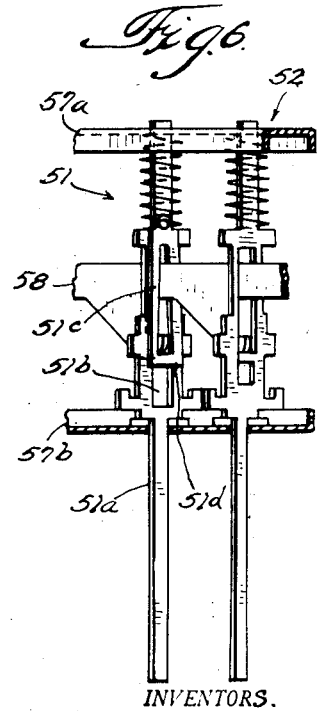
Fig. 6
INVENTORS.
Earl E. Schwarzenbach
& James T. Williams.
By: Robert L. Kahn  Atty.

United States Patent Office 2,801,373
Patented July 30, 1957

2,801,373

AUTOMATIC CYCLING CONTROL

Earl E. Schwarzenbach, Niles, and James T. Williams, Chicago, Ill., assignors to Oak Mfg. Co., Chicago, Ill., a corporation of Illinois Application September 8, 1953, Serial No. 378,712

6 Claims. (Cl. 317—141)

This invention relates to an automatic cycling control and is particularly adapted for use with washing machines for clothes or dishes and for other devices, both domestic and industrial, where a predetermined cycle of operations is to occur. For convenience, a structure embodying the present invention will be described in connection with a domestic washing machine for clothes. However, it will be understood that this is merely exemplary and that other applications are possible with variations in wiring or shape of cams or both. In certain instances, the same cams and wiring may be used for other control purposes.

A conventional washing machine for domestic use requires a large number of switching operations so that the machine may go through a complete operating cycle. Thus as an example, a domestic washing machine has an electric motor for agitating the water or clothes or both during washing proper. This motor may have means associated therewith for changing speed in certain types of machines for spin drying or there may be a different motor for obtaining drying. Additionally, numerous solenoids for controlling a hot water valve, mixed hot and cold water valve, discharge valves and suds saver valve are required for operating the same in certain timed relations. Inasmuch as the various parts of a washing cycle are well known, no detailed description will be given.

It is frequently desirable to change the overall operating cycle by eliminating or shortening certain parts of a cycle. While there are cycling controls available for household machines and the like, such controls suffer from various drawbacks. Many of the controls are complicated and have numerous parts requiring special tooling.

A construction embodying the present invention is relatively simple, uses generally conventional parts and may be adapted easily for different kinds of operating cycles having different periods. An advantage of the present construction embodying the present invention resides in the fact that parts of a cycle may be omitted with ease. A further advantage resides in the fact that the entire apparatus may be reset with minimum trouble. A substantial advantage in the new construction resides in the fact that all contacts are made and broken at high speed.

In order that the invention may be understood, an exemplary embodiment thereof will now be disclosed and described, it being understood, however, that variations in construction and wiring will be made without departing from the scope of the invention therefor, except as defined by the appended claims.

Referring therefore to the drawings:

Figures 1 and 2 form a composite view showing a combined wiring and diagrammatic showing of a cycling control embodying the present invention;

Figure 3 is a cycling schedule illustrating the different connections which may be established by the control illustrated in Figures 1 and 2;

Figures 4 and 5 are details of the reset mechanism;

Figure 6 is a detail of the push-button mechanism.

Figure 1:
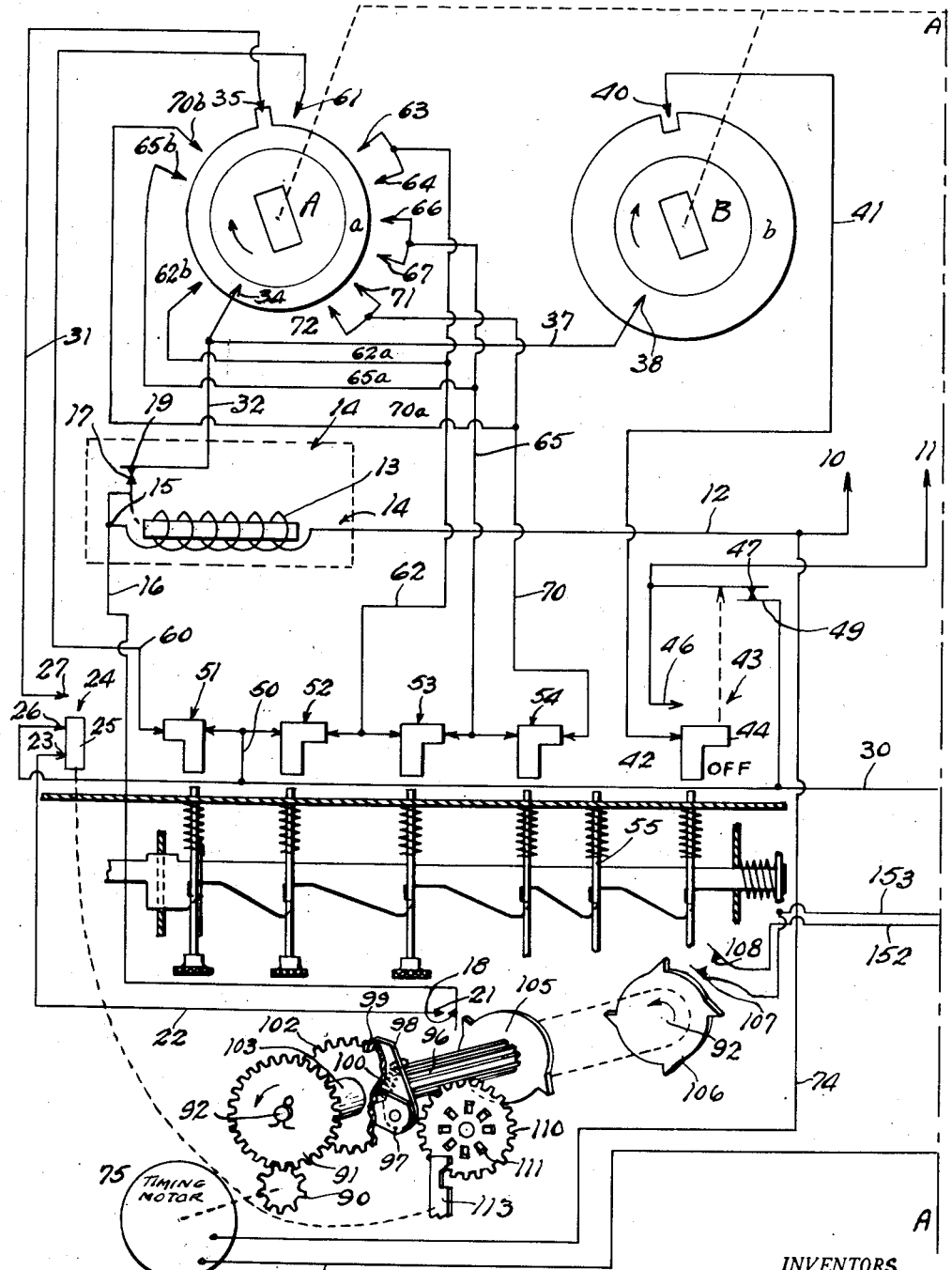

The new control uses a synchronous motor suitably geared for timing. Such motor drives simple mechanical means for controlling a number of contacts. The contacts, which are controlled by cams driven by the motor, generally control a stepping switch which may be advanced one step at a time. Interlocking switches are provided for controlling the character of the operating cycle and also for initiating and stopping the entire cycle of operations.

Terminals 10 and 11 connect the control to a conventional alternating current power line, such as the usual 110 volt 60 cycle supply. Terminal 10 is connected by wire 12 to winding 13 of a solenoid generally indicated by 14 to be described in detail later. Winding 13 has its other terminal connected to junction 15 on wire 16. Wire 16 is connected to contact 17 at one end and to contact 18 at the other end. Contact 17 cooperates with companion contact 19, these two contacts being normally closed. Contact 18 cooperates with contact 21, these two contacts being normally open.

Contact 21 is connected by wire 22 to fixed contact 23 of a two-position switch generally indicated by numeral 24 and having movable contact 25 and additional fixed contacts 26 and 27. Contact 26 is connected to wire 30 while contact 27 is connected to wire 31. Contact 19 is connected to wire 32 and this and wire 31 are connected to certain contacts of a multi-section rotary switch.

In the embodiment illustrated here, the rotary switch has eight sections indicated by letters A to H inclusive. While the rotary switch may be any one of a number of different types, the switch disclosed and claimed in Patent 2,186,949 is particularly suitable. Such a switch has an insulating rotor disc provided with a non-circular aperture disposed on a suitably shaped shaft for rotation. Each rotor disc carries one or more flat contacts having desired angular extent and, in some instances, certain parts projecting beyond the edge of the disc. A stator, not shown in the drawing, supports fixed contact clips which are adapted to make contact with certain parts or projections of the rotor contacts. Thus each switch section has a rotor contact indicated by a small letter corresponding to the capital letters for the particular switch section. As shown, all the rotor contacts extend completely around the rotor and have either projections or notches as shown for obtaining desired switching action.

In the particular example given here, the rotary switch sections are adapted to be moved in 20 degree steps over 360 degrees of angle, thus making 18 steps for a complete series of switching steps. This is merely exemplary and the number may be greater or less, depending upon desired effects.

In switch section A, movable contact $a$ has grounding contact 34 to which wire 32 is connected. Grounding contact 34, as its name implies, is always in contact with rotor contact $a$. By contrast, wire 31 is connected to contact 35, which co-operates with a projecting tip on the rotor contact, when such tip is in the position shown in the drawing. The angular position of the grounding contact is of no importance. However, the angular relative positions of the non-grounding contacts for the various switch sections determine the character of the operating cycle. The exact number of steps between the various contacts will be accurately indicated on the cycling schedule of Figure 3.

Wire 32 is connected by wire 37 to grounding contact 38 for switch section B. The latter switch section has a single notch in the rotor contact so that non-grounding contact 40 will be dead for only one switch step. Contact 40 is connected by wire 41 to fixed contact 42 of off-on switch 43, having movable contact 44. Movable contact 44 is adapted to remain in either off or on position and the movable contact also co-operates with fixed contact 46. Fixed contacts 42 and 46 are so arranged as to be connected together by contact 44 when this contact is moved up from the position shown. Movable contact 44 is also mechanically connected to movable switch contact 47, this latter contact and 46 being connected to power terminal 11. Movable contact 47 co-operates with fixed contact 49 and the coupling of movable contact 47 with movable contact 44 is such that contacts 47 and 49 will open before contacts 42 and 46 are connected together by contact 44.

Contact 49 is connected to wire 30. Wire 30 is connected by jumper 50 to certain of the fixed contacts of switches 51 and 52. Switches 51 and 52 form part of a series of switches 51 to 54 inclusive and 43, adapted to be operated by push-buttons or the like, and so arranged that only one of switches 52 to 54 inclusive and 43 can remain open at any one time. The movable contacts to which the lead lines for switches 51 to 54 inclusive point are fixed to the push rods. When the rod is down, the switch is closed. When the rod is pushed up, the switch is open. The latch bar, when moved by pushing up any rod from 52 to 54 inclusive and 43, releases any of these rods from an up or open switch position.

Switch 51 can remain in open or closed position without affecting switches 52 to 54 inclusive. If any one of the push rods for switches 52 to 54 inclusive or 43 is pushed up while switch 51 is open (push rod up) then switch 51 will be tripped to the closed position shown (push rod down). However, the push rod for switch 51 can be moved so that switch 51 is open after any of the push rods for switches 52 to 54 inclusive have been operated, without affecting switches 52 to 54. The mechanism for operating such switches is well known and is more fully described and claimed in Patents 2,213,845 and 2,289,513. Thus for switches 52 to 54 inclusive and 43, the construction disclosed in Patent 2,213,845 may be used exactly as shown. For switch 51, it is necessary to modify the construction shown in Patent 2,213,845 and instead use the push rod construction shown in Patent 2,289,513.

For convenience, a detail of the push-button switch is shown in Figure 6. Push rod 51a is slidingly supported in two spaced frame members 57a and 57b. Latch bar 58 passes through aligned slots in the various push rods. Push rod 51a has elongated slot 51b and the push rod carries flat spring 51c. Spring 51c is slotted to accommodate the latch bar and top 51d of the spring is positioned where push rod metal ordinarily divides the rod slots. Spring 51c is weaker than the latch bar spring. Hence when rod 51a is pushed up, the latch bar tooth forces spring 51c aside and rod 51a can assume a locked position without tripping the latch bar.

The push button switch arrangement includes one dummy push rod 55. Rod 55 provides as much of an operating setting as the other rods. When rod 55 is operated, any other rods which had been latched in previously are released. Thus, rod 55 when pushed up will insure that all of switches 52 to 54 inclusive are closed and 43 is open.

It will be noted that switches 51 to 54 inclusive have movable contacts operating between fixed contacts and that the various switches are connected in series. The free terminal of switch 51 is connected by wire 60 to contact 61 for switch section A. Between switch sections 52 and 53, wire 62 is connected to contacts 63 and 64 arranged in adjacent positions on switch section A. Between switch sections 53 and 54, wire 65 is connected to contacts 66 and 67 of this same switch section. The free terminal of switch section 54 is connected by wire 70 to contacts 71 and 72 of switch section A. As illustrated here, wires 62, 65 and 70 have branches 62a, 65a and 70a going to fixed contacts 62b, 65b and 70b, respectively.

Line terminal 10 has also connected thereto wire 74 going to one terminal of timing motor 75. Timing motor 75 preferably is of the A. C. self-starting synchronous type as used in electric clocks. Timing motor 75 has its other terminal connected to wire 76 going to movable contact 77. Movable contact 77 cooperates with fixed contact 78 connected by wire 79 to wire 30. Wires 30 and 79 together are connected to grounding contact 80 of switch section G. Switch section G has non-grounding contact 81 connected to non-grounding contact 82 of switch section E and both connect to a terminal of a two-way valve solenoid. This two-way valve and solenoid form part of a washing machine. The two-way valve is to direct water from the washer to drain when the valve solenoid winding is deenergized and to direct water from the washer to a sink for suds storage when the valve solenoid winding is energized. This is true for the example given here. The arrangement may be readily reversed or changed as desired.

Timing motor 75 drives pinion 90. Pinion 90 comes from the motor casing and itself will be geared down with respect to the motor armature so that the pinion may turn once per minute as an example. Pinion 90 meshes with large gear 91 suitably journaled. Gear 91 is coupled to shaft 92. Rotatively disposed over shaft 92 is long gear 96, this consisting of a long piece of gear stock having the required number of gear teeth. Long gear 96 has rigidly secured thereto arm 97 upon which is pivotally secured, at the end, pawl arm 98 having gear tooth engaging finger 99 at the end thereof. Spring 100 biases pawl 98 so that finger 99 bears against the teeth of gear 102. Gear 102 turns with gear 91, gears 91 and 102 being attached to the opposite ends of spacing member 103. Finger 99 is so shaped that if long gear 96 is rotated in a counter-clockwise direction, as seen in Figure 1, finger 99 will slip over the teeth of gear 102. However, when shaft 92 is driven counter-clockwise, gear 102 will have its teeth engaged by finger 99 and will drive long gear 96. It is evident that pawl 98 and finger 99 cooperate with the teeth of gear 102 to provide an over-running or one-way drive for reset purposes.

Rigidly secured to long gear 96 are cams 105 and 106, these two cams being spaced a suitable distance. Cam 105 has two teeth spaced at 180° whereas cam 106 has four teeth at 90° in the example illustrated.

Cam 105 cooperates with contacts 18 and 21 to open and close the same. Cam 106 cooperates with contacts 107 and 108 to open and close the same.

Long gear 96 is a timing member and is reset to a predetermined position at the beginning of an operating cycle for the entire mechanism when the start switch 24 is operated. For accomplishing this, gear 110 is provided for meshing with long gear 96. Gear 110 is suitably secured so that it is always meshing with long gear 96. Gear 110 has a number of ears 111 punched out therefrom, these ears being disposed at uniform angular intervals around the center of the gear. Cooperating with ears 111 is a suitable means for setting gear 110 to one of a number of predetermined angular positions. Referring particularly to Figure 4, push rod 113 has arm 114 pivoted at 115. Arm 114 has portion 116 cooperating with stop 117 punched out of push rod 113 so that clockwise movement of arm 114 is limited to the position shown. Arm 114 has finger 118 to which is attached spring 119 anchored to the push rod at point 120 for the purpose of biasing arm 114 to its extreme position.

Push rod 113 has finger 122 which normally clears ears 111 of gear 110. However, upon movement of push rod 113 to a setting position, finger 122 will enter parallel to the plane of gear 110 into a space between two adjacent ears 111 and act to prevent overshoot of setting gear 110. Arm 114 has head portion 124 shaped as shown. Head portion 124 extends alongside of ears 111 and upon upward movement of push rod 113, as seen in Figure 4, head portion 124 will advance gear 110 in a clockwise direction. The advance due to one movement of push rod 113 is such that gear 110 is left in one of a number of predetermined fixed rotary positions. Suitable means for returning push rod 113 to the dotted line position are provided so that finger 122 will clear ears 111 and permit gear 110 to rotate freely. The gear ratio between gear 110 and long gear 96 is so arranged that long gear 96 will be turned through an angle of 180° or less in this example, so that cams 105 and 106 will always have a definite cycle starting position, irrespective of the cam positions prior to reset. Push rod 113 is mechanically coupled to movable contact 25 of start switch 24 so that reset and start occur simultaneously.

Figure 2:
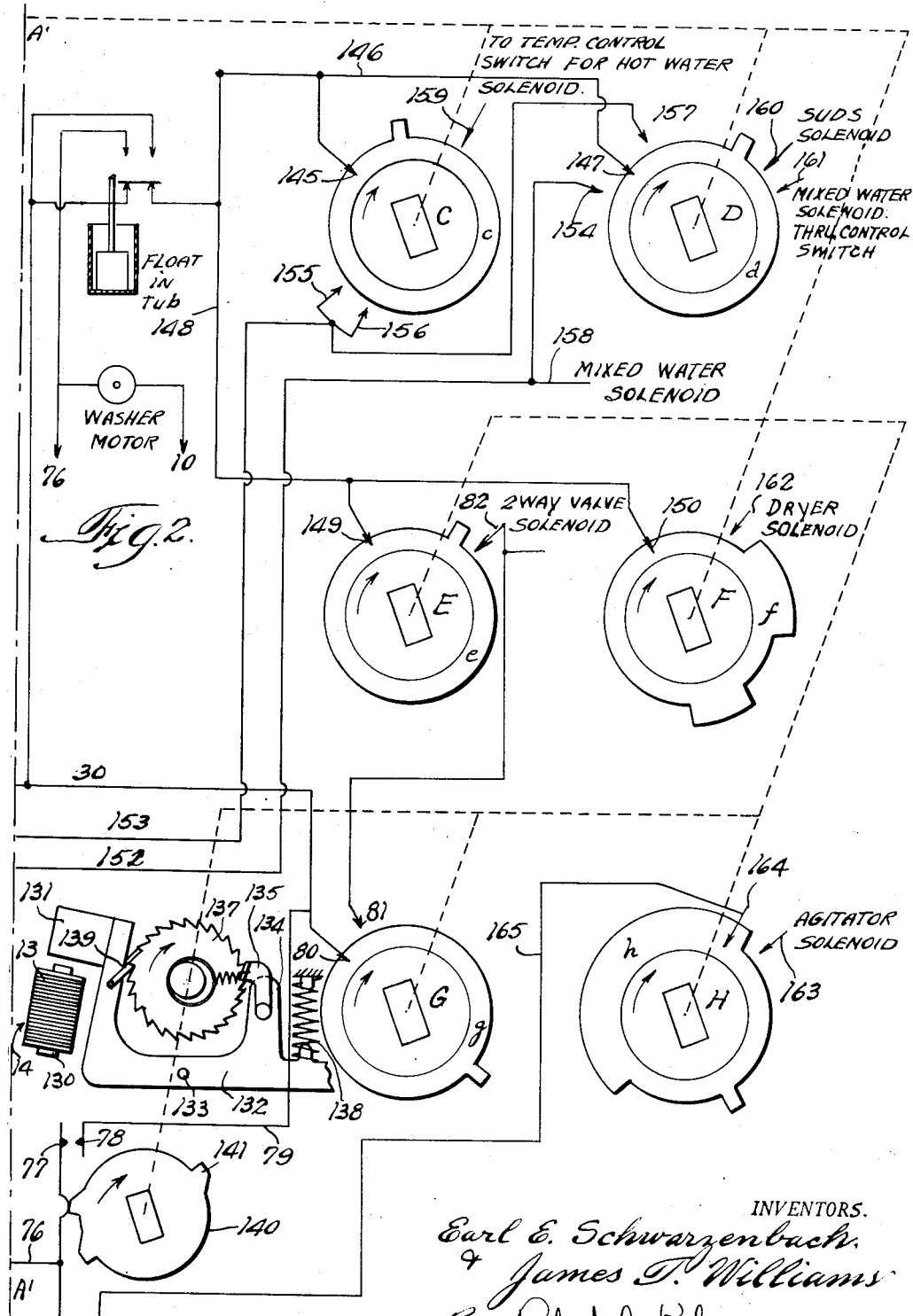

Solenoid 14 is provided with suitable means for driving the eight switch sections in steps of 20° as shown in this example. Referring to solenoid 14 (Fig. 2) core 130 cooperates with armature 131 carried by rocker 132 pivoted at 133. Rocker 132 has finger 134 carrying pawl 135 spring pressed against ratchet gear 137. Rocker 132 is normally biased by spring 138 to the position shown. Upon solenoid energization, armature 131 is pulled down, this operating rocker 132 and permitting pawl 135 to slip along one ratchet tooth. Upon de-energization of the solenoid winding, spring 138 forces rocker 132 back to the position shown, pawl 135 engaging ratchet gear 137 and turning the ratchet gear clockwise through an angle of 20° in this particular instance. Ratchet 137 is mounted upon a suitable shaft carrying the rotors of the various switch sections so that one advance movement of ratchet gear 137 will also cause the eight rotary switch sections to advance 20°. In the example shown, eighteen operations of the solenoid will turn the switches through a complete 360° travel. Finger 139 carried by rocker 132 cooperates with ratchet gear 137 to provide a single tooth advance only and prevent overshoot.

Ratchet gear 137 also drives cam disc 140 having a number of rises 141 distributed at predetermined positions around the periphery of the cam. Cooperating with cam 140 is movable contact 77, this cooperating with fixed contact 78.

Switch sections A to H inclusive and cam disc 140 are stepped by the solenoid. For an exemplary washing machine cycle the switch sections may be wired as shown. Sections A, C, D, E and G have simple rotors with one narrow contact-making extension. Switch section C has grounding contact 145 connected to wire 146. This same wire is also connected to contact 147 for switch section D. From wire 146, branch 148 goes to grounding contacts 149 and 150 of switch sections E and F. Wire 146 is externally connected to a terminal on a float-controlled switch in the washer. The float switch in this instance when the float is down will close a power circuit to wire 30 for wire 146 when the washer tub is empty of water. The power circuit will remain closed until the tub has been filled. The same float when up will close a power circuit from line terminal 11 and wire 30 through motor 75 and the washer motor to terminal 10.

From contact 107, wire 152 goes to contact 154 of switch section D. From contact 108, wire 153 goes to contacts 155 to 157 inclusive on switch sections C and D. Wire 152 has branch 158 for connection to the mixed water valve solenoid in the washer.

Switch section C has contact 159 for external connection to the solenoid winding of the hot water valve. This solenoid winding may be wired through a manual temperature control switch to select hot water instead of mixed hot and cold.

Switch section D has contact 160 for external connection to the solenoid of the suds saver valve. This valve will permit stored suds to be drawn back into the washer tub for washing rather than have the tub entirely filled with new water. In practice, the suds saved is not enough to fill the tub so tap water must be added. Contact 161 on this same switch section is for external connection to the mixed water valve solenoid as wired through a manual temperature control switch. In this contact, the water temperature will be determined by the manual temperature switch. In wire 158, the solenoid control is independent of the manual switch setting.

Switch section F has its rotor f provided with two extensions. Switch section F has contact 162 for external connection to the solenoid of the extractor or damp dry means. This solenoid usually controls a clutch or motor winding so spinning rather than washing occurs. The washer motor furnishes the power. Switch section G has already been described. Switch section H has contact 163 for external connection to the solenoid for the agitator. Contact 164 of this section is connected by wire 165 back to wire 76.

The operation of the control is as follows: First let it be assumed that the push rods for switches 51 and 52 inclusive are up. Switches 51 and 52 are open. The various rotary switch sections A to H inclusive are in normal position, as shown. Now push rod 113 for reset is operated. This brings the mechanism associated with timing motor 75 to the position shown. At the same time, switch contact 25 has been moved up. A circuit is completed for operating solenoid 14. The circuit is as follows: Terminal 11, contacts 47 and 49, wire 30, switch contacts 26 and 27, wire 31, contact 35 of switch section A, rotor contact a, ground contact 34, wire 32, contacts 17 and 19, junction 15, solenoid winding 13, wire 12 to terminal 10.

When solenoid 14 is energized, contacts 17 and 19 are opened. Upon de-energization of winding 13, the solenoid returns to normal position and also advances switch sections A to H inclusive and cam 140 clockwise 20°. The advance of switch rotor a breaks the energizing circuit for solenoid winding 13 (switch 51 is open) so that when contacts 17 and 19 close again, the relay does not advance. It is understood that rod 113 and start switch 24 are now back in normal positions. The control is now in position 1 as indicated in the chart of Figure 3. Wire 30, alive from connection to terminal 11, is connected by wire 79 (Figure 2) to contacts 77 and 78 which are now closed. One circuit continues along wire 76 through the windings of motor 75 (Figure 1) to wire 74 and terminal 10. Motor 75 is now energized and turns cams 105 and 106 in the direction indicated. A cycle, taking two minutes merely as an example, will cause cams 105 and 106 to be turned 180°. Wire 76 also goes to the washer motor and the washer motor circuit will continue to terminal 10 or a wire having the same polarity as 10. The washer motor operates. The chart in Figure 3 illustrates this by showing the washer motor space cross hatched.

Rotary switch sections D and E are in position so that contacts 160 and 82 respectively are made. Rotor d therefore connects the suds solenoid winding to line 146. Rotor e does the same for the winding of the two-way valve. Since the washer tub is dry, the float switch in the tub will complete an energizing circuit for the suds solenoid and winding of the two-way valve. The chart in Figure 3 shows these windings as energized. The washing machine motor being energized results in the pump drawing suds from the sink (in the previous washing operation the suds had been pumped into the sink as otherwise there would be no point in opening switch 51 by pushing the rod). The float switch in the washer as a rule does not cut off the power to rotor sections D and E because the suds water is usually insufficient to fill the tub. The two minutes for step 1 is taken up by the pump operating and the washer operating on the clothes, the agitator being energized by suitable motor means. Switch section H will connect the agitator solenoid energized by contact 163 for position 1 and a number of subsequent positions.

During step 1 (as during all other steps) cams 105 and 106 are being turned and at the end of the time for step 1, the switches controlled by these cams are closed. When contacts 18 and 21 close, a circuit from wire 30 through contacts 26, 23, 21 and 18, solenoid winding 13 to line wire 10 is completed. This same circuit is completed at the end of each step or position of the control. Solenoid 14 operates and advances switch sections A to H inclusive and cam 140 an additional 20°. It is understood that the actual advance occurs when cam 105 opens contacts 21 and 18. At the same time, contacts 107 and 108 are made by cam 106. Nothing happens at this time since switch sections C and D do not, as yet, close any circuits for wires 152 and 153. Cam 140 has now moved to the position where contacts 77 and 78 are open. This opens the circuit for the washing machine motor and also opens the circuit for timing motor 75. If the tub is not as full as required, then the float-operated switch (still down) permits the tub to fill from the conventional water supply. It is understood that the float-operated switches will be operated only when the float is all the way down or all the way up. Thus when the tub is filling, the bottom switch contacts remain closed until the tub is full and then the switches change their conditions. Switch sections C and D in this second position complete circuits for either hot water or mixed water valve solenoid winding energization (depending upon the position of the usual manual control on the washer). In any event, when the washer tub is full, timing motor 75 (and washer motor) are energized through the float switch.

The next operation of solenoid 14 causes cam 140 to move and contacts 77 and 78 remain closed for quite a while. With the push-button switches as arranged, solenoid 14 steps the rotary switches along at the end of each time period without changing circuits until period ten is reached. Then switch section H opens the agitator circuit. Switch section G closes the two-way valve circuit. The suds are discharged by the pump motor of the washer into the sink. This always happens no matter what position 51 has. If the suds are not to be saved for subsequent washing, the sink drain may be opened to discharge the suds.

The next operation of solenoid 14 at the end of the tenth period of time is to arrange for the energization of the extractor or damp dryer. Section F closes a circuit for the solenoid for the extractor or dryer, this remaining on for two periods 11 and 12. At the same time, rotor c co-operates with contacts 155 and 156 to make momentary water sprays on the wet clothes in the tub. The momentary closing of contacts 107 and 108 at the end of each half period will permit water to be introduced from a water supply while these contacts are closed.

At the end of period 12, cam 140 has come around to the position where rise 141 opens switch contacts 77 and 78. At this time, the tub of the washing machine has been emptied, the two-way valve having let the water out during periods 11 and 12. The water remaining in the machine consists of the suds residue in the wet wash plus the spray water. The main suds water had been previously discharged into the sink.

At the beginning of period 13 the mixed water valve is opened because of switch rotor d closing against contact 154 and energizing its solenoid winding. The float switch in the washing machine for energizing the water valve circuit is now down. The washer motor and timing motor 75 are de-energized. Water enters the tub and fills the same. When the float reaches the top position, timing motor 75 and washer motor are again energized from external connections through the float switch as at the beginning of period 2. At the same time the agitator solenoid is energized, switch section H having the isolated small extension from the rotor engaging contact 163. The agitator will be energized during the thirteenth period. The motor in the washing machine and timing motor 75 remain energized through to the end of the seventeenth period.

In the fourteenth period, contacts 77 and 78 are closed and all other contacts on switch sections A to H inclusive are open. The washer motor is energized but not the agitator solenoid. Internal means are provided to pump water from the machine into the drain. At the end of the fourteenth period the washing machine tub is empty of all water except that contained in the wet clothes.

At the beginning of the fifteenth period, the extractor solenoid is energized, this being controlled by switch section F, the extractor solenoid remaining energized until the end of the seventeenth period.

During the seventeenth period, switch section B is in the position just prior to the normal position shown in the drawing. The control cycles through a two minute period as described above. After the seventeenth period ends, solenoid 14 advances and cam 140 is back again to the position shown in Figure 2 with contacts 77 and 78 open. The rotary switch sections are also back to the positions shown. Hence when contacts 77 and 78 open and stop timing motor 75, there are no external connections in the washing machine which can operate to keep timing motor 75 going, since the float is down.

At any time during the operation of the control, if the control cycle is to be terminated, switch 43 is operated. When switch 43 is operated, contacts 47 and 49 are first opened. This cuts off all power from terminal 11 except through contact 46. The opening of contacts 47 and 49 also serves to open the circuits for the various windings controlled by the various switch sections of the rotary switch. Then contacts 42 and 46 are closed. This sets up a circuit for causing solenoid 14 to step continuously until switch sections A to H inclusive have been advanced to positions corresponding to the end of the entire control cycle as shown. This circuit may be traced as follows: from line wire 11 through contacts 46 and 42, wire 41, contact 40 and rotor b, contact 38, wire 37, wire 32, contacts 19 and 17, relay winding 13, wire 12 to terminal 10. Every time that solenoid 14 operates, contacts 17 and 19 are opened, permitting the solenoid to return to a de-energized position whereupon the rotary switch sections are advanced one step. The stepping switch continues to advance until rotor b reaches the position shown in Figure 1, whereupon the energizing circuit for the relay is open to contact 40.

When the push rod for switch 51 is down so that switch 51 is in the position shown, solenoid 14 is caused to step through the first position. The circuit for this is made when switch section A has the outwardly extending tongue contacting against contact 61, this being the first position. A circuit for energizing solenoid 14 is established as follows: from terminal 11, through contacts 47 and 49, to line 30, thence up wire 50 through switch 51 to wire 60, contact 61, rotor a, ground contact 34, wire 32, contacts 19 and 17, winding 13, wire 12 to terminal 10. Thus as soon as the control has been operated by pressing the start button, stepping solenoid 14 will advance one position because of the operation of the start button and will advance to the second position because of the position of switch 51.

If switch 52 is in the closed position, as shown, then solenoid 14 will automatically step through the positions where contacts 63 and 64 are engaged by rotor a. This results in steps 3 and 4 being omitted. As shown, extra contact 62b is also connected to wire 62 so that step 12 will be omitted.

If switch 53 and switch 52 are both in the closed position, as shown, then positions 3 to 6 inclusive and 12 and 15 will be omitted when contacts 66, 67 and 65b are engaged. It is clear that switch 52 must be closed for the closed position of switch 53 to be effective. This, of course, is obtained by merely pressing upon the push-rod corresponding to switch 54, this leaving switches 52 and 53 closed. Since the latch bar for switches 51 to 54 inclusive is so arranged that only one of switches 52 to 54 inclusive may be in the open position, it is clear that when switch 52 is open, switches 53 and 54 are also effectively open. When switch 53 is open, switch 54 is effectively open. When switch 54 is open, switches 52 and 53 are closed.

If switch 54 is closed with 52 and 53, then the relay will continue stepping through positions 3 to 8 inclusive and 12, 15 and 16.

It will thus be evident that various arrangements of switching and additions or omissions of cycle steps are possible by rearranging the wiring and controlling the shape and disposition of the contacts in the stepping switch sections A to H inclusive. As illustrated, the control has 17 active positions and a dead position 18. Just as soon as the start button is operated, the control advances into position 1.

While a rotary type of stepping switch has been shown, it is clear that other types of switch mechanisms may be used. It is also possible to use a stepping switch wherein a limited range of movement is provided, the movable contacts being returned to a starting position upon reaching the end of the travel. If such switching means are used, the stepping switch will reach the end of its range after the seventeenth period, the stepping switch being in its last position prior to starting when the entire mechanism is in the off position, this corresponding to the eighteenth position. Upon operation of the starting button, suitable means will be provided for closing a circuit for a winding for tripping the detent mechanism upon the stepping switch to permit the stepping switch to return to a normal No. 1 position. Other arrangements are also possible.

Contacts 107 and 108 on the one hand and 18 and 21 on the other may include suitable means for providing fast make and break.

What is claimed is:

1. A control for mechanism to be cycled through a series of operations, said control having an overall control cycle consisting of a number of component time intervals of substantially equal duration, said control comprising an electric timing motor including a winding, a first electric switch having a normal position and adapted to be momentarily moved to an off-normal position, means connecting said timing motor and said switch to momentarily change said switch condition from normal to off-normal at periodic substantially equal time intervals, a stepping switch including an operating winding, said stepping switch including stepping contacts and having a definite number of steps making up the range of said stepping switch, said stepping switch having contacts available for connection to mechanism to be cycled, an operating circuit including said first switch and said stepping switch winding for advancing the stepping switch so that when said timing motor is going the momentary change in condition of said first switch will actuate said stepping mechanism to advance the stepping switch one step in its range, a manual starting switch stable in normal position only, circuits connecting said manual starting switch and said stepping switch operating winding for manually advancing said stepping switch one step from a normal rest position upon operation of said start switch, means including stepping switch contacts for closing the timing motor winding circuit after said start switch has been operated, a plurality of additional manual switches, said additional manual switches having stable normal and off-normal positions, circuits connecting said additional manual switches and contacts in said stepping switch whereby the movement of an additional manual switch to an off-normal position will cause said stepping switch to advance itself a desired number of steps, depending upon the circuitry, independently of the action of said timing motor and first switch, and connections between stepping switch contacts and the timing motor winding for de-energizing said timing motor when said stepping switch has reached the end of its operating range whereby the control cycle duration may be shortened by said component time intervals depending upon the actuation of said additional manual switches.

2. The control according to claim 1 wherein said stepping switch is of the rotary type and wherein said stepping switch includes a movable armature for operating the same, spring means for biasing said armature to a normally inactive position and wherein said first electric switch is normally open, and wherein said armature drives said stepping switch upon the return stroke of said armature under the influence of said spring bias.

3. The control according to claim 1 wherein a gear drive is provided for said motor for operating said first electric switch, said gear drive including a cam for operating said first switch and wherein means interlocked with said starting switch are provided for orienting the position of said switch cam so that said timing motor drive is properly oriented at the beginning of an operating cycle for the control.

4. The control according to claim 1 wherein an additional electric switch is provided, said additional switch having a normal position and adapted to be momentarily moved to an off-normal position, means connecting said timing motor and said additional switch to momentarily change the condition of said additional switch at periodic substantially equal time intervals, and contacts in said stepping switch in series with said additional switch for performing additional functions.

5. The control according to claim 1 wherein said stepping switch is of the rotary type, an additional electric switch having a normal position and adapted to be momentarily moved to an off-normal position, means connecting said timing motor and said additional switch to momentarily change the switch condition from normal to off-normal at periodic substantially equal time intervals, and connections between said additional switch and certain contacts of the stepping switch for providing additional switching functions.

6. The control according to claim 1 wherein a release manual control is provided, said release manual control having interlocking means connecting the same with said additional manual switches for restoring said additional manual switches to normal position.

References Cited in the file of this patent

UNITED STATES PATENTS

| | | |
|---|---|---|
| 2,339,111 | Reid | Jan. 11, 1944 |
| 2,427,396 | Farny | Sept. 16, 1947 |
| 2,579,260 | Horgan | Dec. 18, 1951 |
| 2,581,510 | Ashworth | Jan. 8, 1952 |
| 2,603,725 | Dietrich | July 15, 1952 |
| 2,644,119 | Harris | June 30, 1953 |
| 2,668,261 | Hooker | Feb. 2, 1954 |